(12) United States Patent
Wang

(10) Patent No.: US 8,922,747 B2
(45) Date of Patent: Dec. 30, 2014

(54) LIQUID CRYSTAL PANEL, OLED DISPLAY PANEL, GLASS SUBSTRATE AND MANUFACTURING METHOD THEREOF

(75) Inventor: Yewen Wang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 313 days.

(21) Appl. No.: 13/376,185

(22) PCT Filed: Dec. 3, 2011

(86) PCT No.: PCT/CH2011/083416
§ 371 (c)(1),
(2), (4) Date: Dec. 4, 2011

(87) PCT Pub. No.: WO2013/078691
PCT Pub. Date: Jun. 6, 2013

(65) Prior Publication Data
US 2013/0135571 A1 May 30, 2013

(30) Foreign Application Priority Data
Nov. 29, 2011 (CN) .......................... 2011 1 0386572

(51) Int. Cl.
*G02F 1/1333* (2006.01)

(52) U.S. Cl.
USPC .......................................................... 349/158

(58) Field of Classification Search
CPC .................................... C03C 1/00; C03C 3/00
See application file for complete search history.

(56) References Cited

U.S. PATENT DOCUMENTS

| | | | |
|---|---|---|---|
| 6,216,491 B1 * | 4/2001 | Fehlner ........................... | 65/25.3 |
| 6,833,089 B1 * | 12/2004 | Kawahara et al. .......... | 252/520.2 |
| 2004/0090588 A1 * | 5/2004 | Kim et al. ..................... | 349/158 |
| 2011/0263064 A1 * | 10/2011 | Wieting .......................... | 438/61 |

FOREIGN PATENT DOCUMENTS

| | | |
|---|---|---|
| CN | 1162575 A | 10/1997 |
| CN | 102254982 A | 11/2011 |
| CN | 102473644 A | 5/2012 |
| JP | 2009157057 A | 7/2009 |
| TW | I227505 B | 2/2005 |

OTHER PUBLICATIONS

Li Jun, the International Searching Authority written comments, May 2012, CN.
Peng Hailiang, the first office action, Jun. 2012, CN.

* cited by examiner

*Primary Examiner* — Thanh-Nhan P Nguyen
(74) *Attorney, Agent, or Firm* — IPro, Inc.; Na Xu

(57) ABSTRACT

The present invention discloses a liquid crystal panel, an OLED display panel, a glass substrate and the manufacturing method thereof, wherein, the liquid crystal panel comprises the opposite first substrate and second substrate. The first substrate and the second substrate respectively include a glass substrate. At least one of the first substrate and the second substrate includes an isolating layer, which is arranged on the inner surface of the glass substrate, for isolating the active alkali metal of the glass. Because the present invention uses the ordinary alkali free glass on the liquid crystal panel or the OLED panel as the glass substrate, and arranges an isolating layer on the glass substrate, the isolating layer can prevent the active alkali metal in the alkali free glass like active sodium ion, kalium ion etc. from reacting with other substances, thereby avoiding damages to devices in the panel resulting from the reaction between the active alkali metal like sodium ion or kalium ion and other substances, and increasing the lifetime of the Liquid Crystal Display (LCD) device and the OLED display device.

4 Claims, 1 Drawing Sheet

LIQUID CRYSTAL PANEL, OLED DISPLAY PANEL, GLASS SUBSTRATE AND MANUFACTURING METHOD THEREOF

TECHNICAL FIELD

The present invention relates to the field of the liquid crystal display, and more particularly to a liquid crystal panel, an OLED display panel, a glass substrate and the manufacturing method thereof.

BACKGROUND

In the traditional manufacturing process of the LCD/OLED (Liquid Crystal Display/Organic Light Emitting Diode Display), the glass substrate used is the alkali free glass, for example, for liquid crystal panel of Liquid Crystal Display (LCD), the glass substrates used in the manufacturing process of the array (array substrate) and the color filter (color filter substrate) are alkali free glasses. However, there is generally a little alkali metal like sodium ion and kalium ion contained. The sodium ion or the kalium ion are relatively active, and are easy to react with other substances, thereby resulting in the deterioration of devices.

The alkali may pollute the dielectric material in the TFT gate (Thin Film Transistor gate), thereby reducing the lifetime of the device. The mobility of the sodium ion is the highest and is the most pollutant, therefore, the TFT-LCD requires the alkali free glass as the glass substrate. The sodium ion content of the ordinary alkali free glass is $(1–2) \times 10^{-3}$ which is caused by the raw material or the fireproof material. The alkali content requirement of the substrate and the TFT interface is lower than $5 \times 10^{-5}$, therefore, the alkali metal content shall be controlled as much as possible.

In the increasingly mature manufacturing process of the Liquid Crystal Display (LCD) panel at present, the cost is an important factor to increase the competitiveness. The glass substrates currently used for global LCD/OLED are monopolized by the Corning, the Asahi Glass, the Nippon Sheet Glass and the Nippon Electric Glass, therefore, the price is high. Because the sodium ion content of the alkali free glass is $(1–2)~10^{-3}$, while the alkali content requirement in the panel industry is lower than $5 \times 10^{-5}$, the requirement of the glass substrates used for LED/OLED is difficult to meet.

SUMMARY

One aim of the present invention is to provide a liquid crystal panel, an OLED display panel and a glass substrate of superior performance, long lifetime and low cost, and the manufacturing method thereof.

The aim of the present invention is achieved by the following technical schemes: a liquid crystal panel comprises the opposite first substrate and second substrate; the first substrate and the second substrate respectively includes a glass substrate, and at least one of the first substrate and the second substrate includes an isolating layer, which is arranged on the inner surface of the glass substrate, for isolating the active alkali metal in the glass.

Preferably, the isolating layer is an alumina layer. The alumina is a stable material which is difficult to react with the sodium ion and is difficult to react with other substances.

Preferably, the isolating layer is the aluminum hydroxide aerosol layer. The characteristic of the aluminum hydroxide is similar to that of the alumina, both are appropriate to serve as the isolating layer.

Preferably, the liquid crystal panel is of COA structure, and an isolating layer is arranged on the inner surface of the glass substrate of the first substrate. The strong acid may be multiple contacted in the etch process, however, for the liquid crystal panel of COA structure, only Black Matrix (BM) is required to be deposited on the first substrate, therefore, adding the isolating layer to the first substrate can effectively reduce the effect of the alkali metal on the liquid crystal.

Preferably, the glass substrate is the ordinary alkali free glass with the sodium ion content lower than $10^{-3}~2\times10^{-3}$. When protecting with isolating layer, simultaneously reducing the sodium ion content of the glass substrate, in order to reduce as much as possible the alkali resulting from the reaction between the alkali metal and the outer substances.

An OLED display panel comprises the glass substrate, wherein, the glass substrate includes the glass substrate and an isolating layer, which is arranged on the surface of the glass substrate, for isolating the sodium ion/kalium ion in the glass.

A method for manufacturing the glass substrate comprises the following steps:

A: The isolating layer for isolating the active alkali metal in the glass is applied on the surface of the glass substrate.

Preferably, in step A, the isolating layer is applied by coating. The CVD can form a good isolating layer on the surface of the glass, and will not result in the reaction between other substances and the glass during deposition.

Preferably, the CVD is the DEGUSSA CVD. The DEGUSSA CVD can prepare the alumina/aluminum hydroxide aerosol of uniform particles and good transparency.

Preferably, the glass with the isolating layer is dried after step A. The dried isolating layer has a high penetration rate and chemical stability which perform an isolation function.

Preferably, the drying treatment is completed through the instantaneous drying by using the gas of 200~550° C. The instantaneous high temperature drying is performed, so that the isolating layer is stable.

Preferably, the gas is the natural gas. The natural gas is difficult to react with the alumina, and has a good drying effect.

A glass substrate comprises an isolating layer, which is arranged on the inner surface of the glass substrate, for isolating the active alkali metal in the glass.

Because the present invention uses the ordinary alkali free glass on the liquid crystal panel or the OLED panel as the glass substrate, and arranges an isolating layer on the glass substrate, the isolating layer can prevent the active alkali metal in the alkali free glass like active sodium ion, kalium ion etc. from reacting with other substances, thereby avoiding damages to devices in the panel resulting from the reaction between the active alkali metal like sodium ion or kalium ion and other substances, and increasing the lifetime of the LCD device and the OLED display device.

Wherein: 1. Glass; 2. Isolating layer; 3. Black matrix.

DETAILED DESCRIPTION

The present invention will further be described in detail in accordance with the figures and the preferred examples.

The present invention provides a liquid crystal panel comprises the opposite first substrate and second substrate; The first substrate and the second substrate respectively includes a glass substrate, and at least one of the first substrate and the second substrate includes an isolating layer, which is arranged on the inner surface of the glass substrate, for isolating the active alkali metal of the glass. The glass substrate of the present invention includes a glass and an isolating layer arranged on the glass. Because the present invention uses the ordinary alkali free glass on the liquid crystal panel or the OLED panel as the glass substrate, and arranges an isolating layer on the glass substrate, the isolating layer can prevent the active alkali metal in the alkali free glass like active sodium ion, kalium ion etc. from reacting with other substances, thereby avoiding damages to devices in the panel resulting from the reaction between the active alkali metal like sodium ion or kalium ion and other substances, and increasing the lifetime of display devices using such glass substrate like LCD device and the OLED display device.

Figure 1:
FIG. 1 is a structural diagram of an example of the present invention.

FIG. 1 shows a glass substrate of the scheme of the present invention, as shown in the figure, the glass substrate comprises a glass 1 and an isolating layer 2 arranged on the glass. Wherein, the glass 1 is the ordinary alkali free glass which contains relatively active alkali metal like sodium ion with content of 10−3~2×10−3 and some kalium ion. The isolating layer 2 is mainly the pellumina, and the alumina is a stable material which is difficult to react with the sodium ion and is difficult to react with other substances, and can form a protective isolating layer on the surface of the glass 1, thereby avoiding the alkali metal of the glass 1 like sodium ion reacting with the liquid crystal panel or other substances in the OLED display panel, and effectively protecting devices like TFT in the panel, and because the sodium ion content of the ordinary alkali free glass is higher than that of high purity alkali free glass, the alkali free glass requirement is simpler than that of the liquid crystal panel or the OLED display panel, and the production cost is low, therefore applying the glass substrate to the liquid crystal panel or the OLED display panel can significantly reduce the production cost of the glass substrate.

Of course, the material used for the isolating layer 2 is not limited to the alumina material, for example, the aluminum hydroxide is also acceptable, and the aluminum hydroxide can serve as the aerosol, and be applied on the glass 1.

For LCD device, because the strong acid may be multiple used in the etch process of the second substrate (i.e. array substrate) of the liquid crystal panel, the alumina or the aluminum hydroxide aerosol is not applicable to serve as the isolating layer, and other material may be used.

Figure 2:
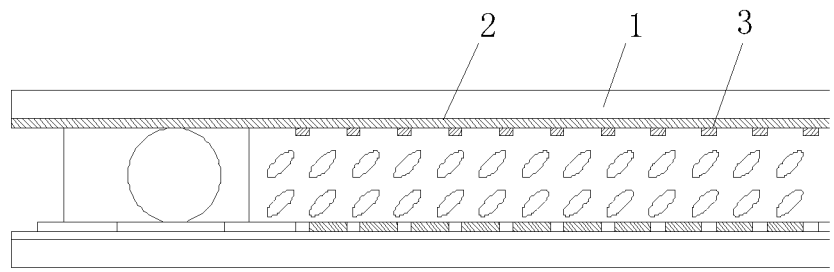
FIG. 2 is a structural diagram of a liquid crystal panel of an example of the present invention.

However, for the liquid crystal panel of COA structure, as shown in FIG. 2, the first substrate (i.e. color filter substrate) only comprises the glass 1 and the Black Matrix 3 (BM), therefore, a layer of alumina or aluminum hydroxide aerosol may be applied as the isolating layer 2 on the glass to avoid the alkali metal reacting with the outer substances.

Take the liquid crystal panel of COA structure for example, the isolating layer i.e. the alumina layer can be applied on the glass by the CVD, particularly, a alumina layer can be formed on the surface of the glass by the DEGUSSA CVD. Then, the alumina layer is dried by using the natural gas of 200~550° C. and other gases like instantaneous high temperature steam drying. The alumina layer has a high penetration rate and chemical stability, and can perform an isolation function. Finally, the BM (Black Matrix) is deposited on the formed glass substrate to complete the preparation of the color filter substrate.

The present invention is described in detail in accordance with the above contents with the specific preferred examples. However, this invention is not limited to the specific examples. For the ordinary technical personnel of the technical field of the present invention, on the premise of keeping the conception of the present invention, the technical personnel can also make simple deductions or replacements, and all of which should be considered to belong to the protection scope of the present invention.

The invention claimed is:

1. A liquid crystal panel comprises: the opposite first substrate and second substrate; the first substrate and the second substrate respectively includes a glass substrate, and at least one of the first substrate and the second substrate includes an isolating layer, which is arranged on the inner surface of the glass substrate, for isolating the active alkali metal in the glass, wherein the glass substrate is the ordinary alkali free glass with the sodium ion content higher than 5×10−5 and lower than 10−3~2×10−3.

2. The liquid crystal panel of claim 1, wherein the isolating layer is an alumina layer.

3. The liquid crystal panel of claim 1, wherein the isolating layer is an aluminum hydroxide aerosol layer.

4. The liquid crystal panel of claim 1, wherein the liquid crystal panel is of COA structure, and an isolating layer is arranged on the inner surface of the glass substrate on the first substrate.

* * * * *